Aug. 29, 1933.    G. E. BLINN    1,924,305
DUCT SUPPORT
Filed June 5, 1931    2 Sheets-Sheet 1
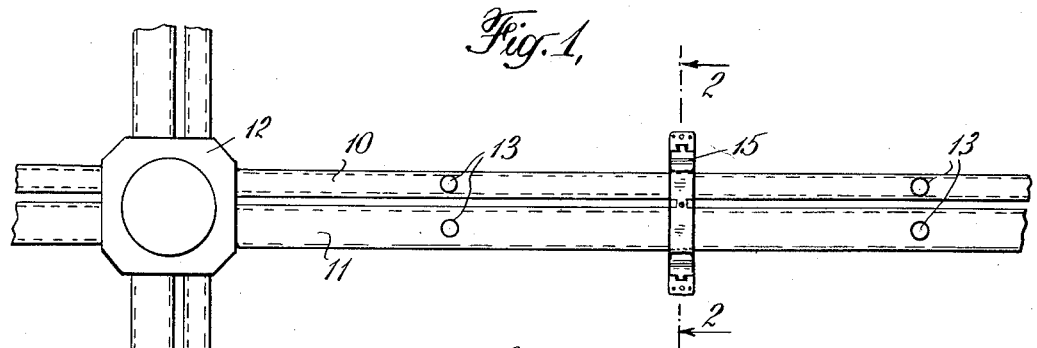
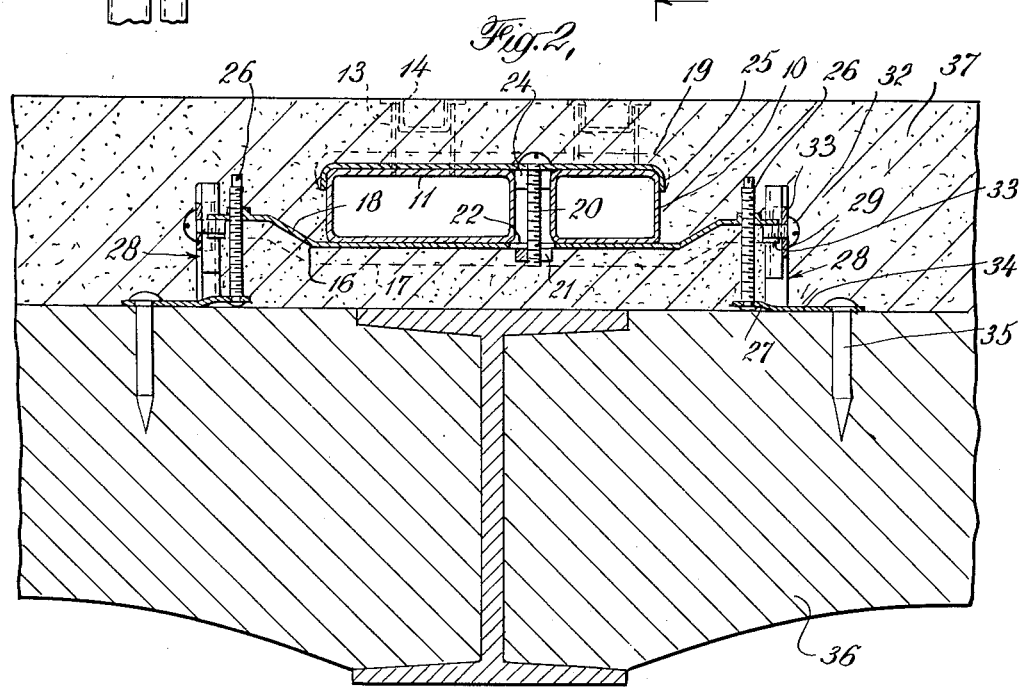
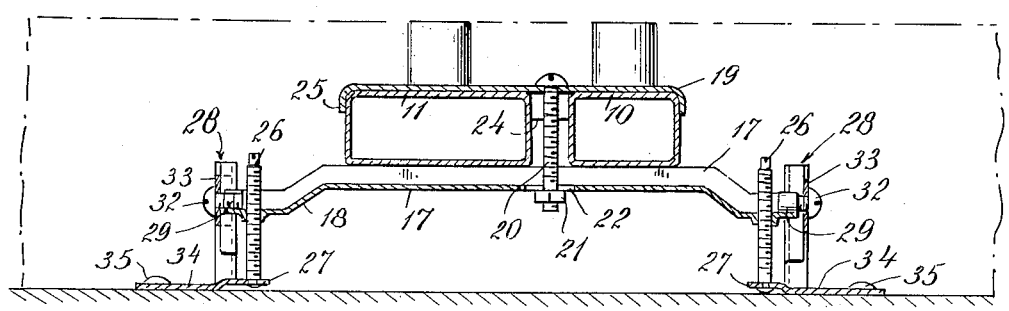
INVENTOR
Glenn E. Blinn
BY
ATTORNEYS

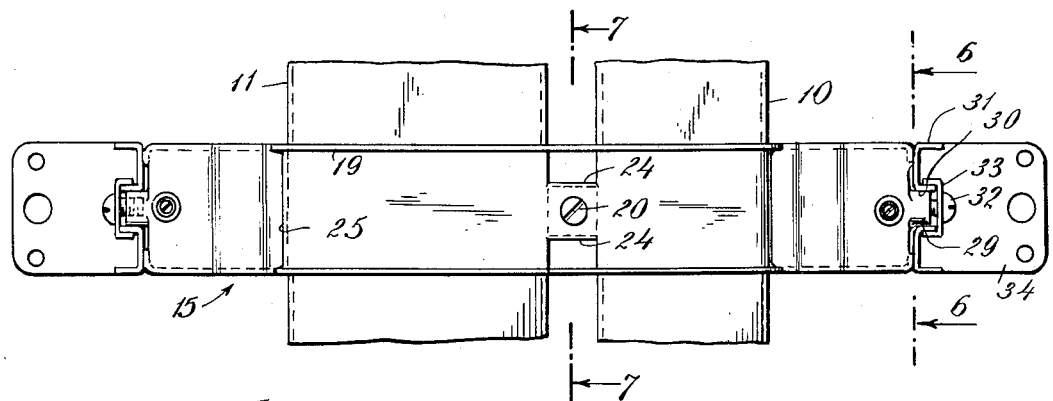
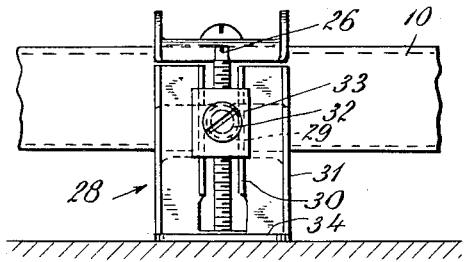
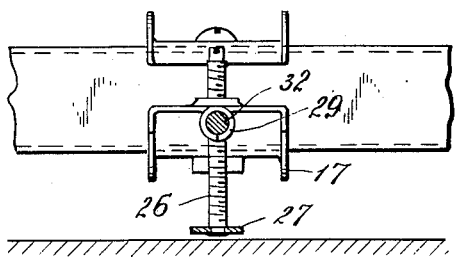
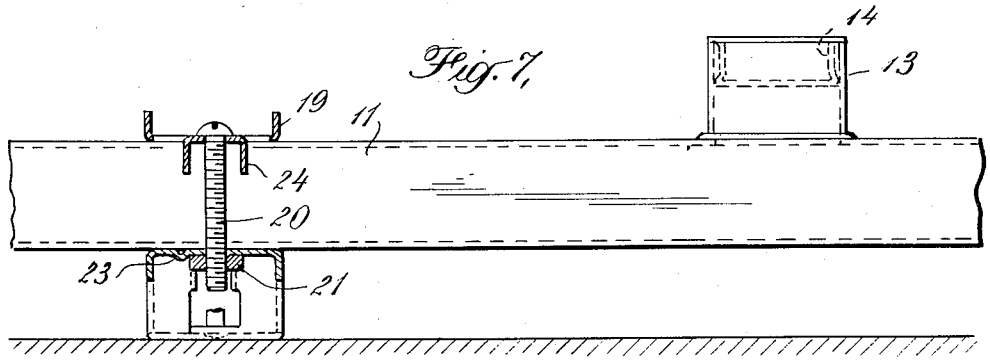
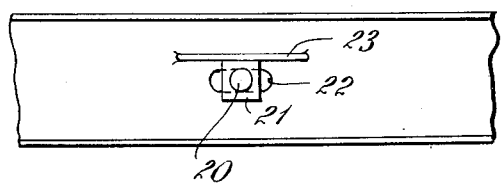

Patented Aug. 29, 1933

1,924,305

UNITED STATES PATENT OFFICE 1,924,305

DUCT SUPPORT

Glenn E. Blinn, New York, N. Y., assignor to Hervey S. Walker, Ardmore, Pa.

Application June 5, 1931. Serial No. 542,276

17 Claims. (Cl. 247—3)

This invention relates to a novel duct support for supporting one or more ducts arranged in parallel runs, the support being adjustable vertically so that the duct can be maintained at different distances above the surface on which the support rests. The support of the invention is primarily useful in connection with an underfloor duct system and a form of the support particularly suitable for that purpose will be described in detail by way of illustration, although it is to be understood that the utility of the support is not limited to that particular use.

In modern concrete buildings, particularly for office purposes, it is now the common practice to install ducts in the floor for the purpose of concealing the wiring for electric lights, telephones, enunciators, and other similar purposes. These ducts are arranged ordinarily in a network and they extend between floor boxes in which connections can be made. In installing such a system, it is a practice to place the boxes at the desired locations on the rough floor slab and then place the ducts in the runs from one box to another with the ends of the ducts received in openings in the box walls. These openings usually lie a short distance above the surface of the slab so that the ducts lie clear of the slab and as the runs may be of considerable length, it is desirable to provide some means for supporting the ducts between the boxes so that the ducts can be maintained level. In certain duct systems, such as that disclosed in Walker Patent No. 1,592,548, issued July 13, 1926, the ducts are provided with a multiplicity of outlets which extend up toward the floor level. These outlets are initially closed by caps the tops of which should lie in the plane of the floor surface, so that access into the duct at any outlet can be easily accomplished by removal of the cap. In such systems, it is particularly desirable that the ducts be maintained level by a support which affords an accurate adjustment.

The present invention is, accordingly, directed to the provision of a support which serves the purposes above indicated. This support is constructed for use in systems in which the runs contain one or more ducts and it includes means for securing the ducts firmly in position on the supports and for accurately adjusting the level of the ducts. The new support is constructed of metal, it is of low cost and it affords a wide range of adjustment and can be readily installed in position. When the adjustment is effected, the parts can be secured firmly in position so that variation in the duct level cannot occur.

For a better understanding of the invention, reference may be had to the accompanying drawings in which Fig. 1 is a plan view of a portion of a two-duct system showing a support in position;

Fig. 2 is a cross-sectional view on the line 2—2 of Fig. 1;

Fig. 3 is a view similar to Fig. 2, but showing the support arranged to maintain the ducts at a higher level;

Fig. 4 is a plan view of the support on an enlarged scale;

Fig. 5 is an end view of the support;

Figs. 6 and 7 are sectional views on the lines 6—6 7—7 respectively, of Fig. 4; and Fig. 8 is a bottom plan view of a portion of the support;

Referring now to the drawings, the system illustrated in Fig. 1 is the two-duct type, both ducts 10 and 11 being of the same height but the duct 11 having a greater width than duct 10. These ducts lie parallel and extend between boxes, one of which is illustrated at 12.

The ducts are of the type disclosed in Walker Patent No. 1,592,548 and each duct is provided with tubular outlets 13, which extend upwardly from the top of the duct substantially to the floor level and are closed by caps 14, the rim of each cap preferably lying in the floor surface so as to be visible and thus indicate the position of the outlet. The runs of ducts between boxes are mounted in supports 15, only one of which is shown.

Each support 15 includes a base member 16 made of a strip of metal formed with a smooth top surface and provided with edge flanges 17 turned at an angle to the surface. The base member is formed with a dip indicated at 18 and the flat surface of the base in the dip is wide enough to carry a plurality of ducts. In the construction illustrated, the support is arranged to carry a pair of ducts and these ducts are held in place by a top member 19 which rests on the top surface of the pair of ducts and is secured to the base member by a bolt 20 with a nut 21. The top member is made of a strip of metal with edge flanges and the bolt extends through an opening in the top member and through a slot 22 in the base member so that the top member and ducts can be adjusted laterally on the base member by the length of the slot 22. The under surface of the base member is provided with a projecting rib 23 against which the side of the nut 21 bears so that the nut is held against rotation as the bolt is turned up. The top member is also provided with downwardly struck tongues 24 which lie between the ducts and serve to keep the ducts in proper spaced relation. The ends 25 of the top member are curved to conform to the corners of the ducts so that when the bolt is tightened, the ducts are held firmly in position on the base member and kept at their proper relative spacing.

The base member is provided at each end with an adjustment screw 26 which passes through a threaded opening in the member and extends through a tongue 27 struck from a supporting post 28. The adjusting screw has a head below the tongue 27 so that the screw is secured to the tongue against accidental removal but is free to turn.

Each of the posts 28 consists of a piece of sheet metal having a central open-top slot through which a tongue 29 on the end of the base member projects and this slot is formed by striking tongues 30 from the face of the post, these tongues lying at right angles to the face. The post is also provided with edge flanges 31 for strengthening purposes. Extending through the slot in the post is a locking screw 32, on which is mounted a U-shaped member 33, which straddles the tongues 30. The screw 32 is threaded into a portion of the end of the base member and when the screw is drawn tight, it forces the U-shaped member 33 against the tongues 30 to lock the base member in position on the post. At the lower end, each post has a foot 34 which extends at right angles to the post and is intended to lie flat on the surface on which the post is mounted. This foot is provided with one or more openings through which nails 35 may be driven to anchor the post in proper position on the surface.

In using the support it is mounted on the rough floor slab 36 beneath the runs of duct, the screws 32 turned back, and the support then raised or lowered to bring the ducts in the proper level by turning the adjustment screws 26. When the adjustment has been obtained, the screws 32 are tightened to secure the parts in the desired position. While the screws 26 provide a fine adjustment for the duct level, it has been found that unless locking means are provided such as the screws 32, this adjustment may not be maintained and this is particularly true in underfloor systems where the ducts are placed on the floor slab before the finishing layer 37 of concrete is poured. The ducts may be exposed for some time before the floor is completed and workmen are likely to step on the ducts or run wheelbarrows over them. Although the ducts may be originally accurately levelled, such treatment frequently causes the adjustment to vary unless locking means are used.

In the support as illustrated in Fig. 2, it will be apparent that the ducts may be adjusted to any level within a given range, the lower limit of adjustment occurring when the flanges on the base member rest on top of the rough slab and the upper limit, when the base member is raised to the top of the screws 26. This provides a considerable range of adjustment but the range can be increased by reversing the base member as illustrated in Fig. 3. In this arrangement the base member has been turned top for bottom and the depression shown in Fig. 2 has become an elevation. The ducts now lie on the edges of the flanges 17 of the base member and are secured in place by the top member 19 and bolt 20 as in the previous arrangement. With the support in the condition illustrated in Fig. 3, the ducts may be supported at a considerably higher elevation than is possible with the support used in the condition shown in Fig. 2. There is no difficulty in changing the base member from one position to the other since all that need be done is to remove the screws 32, and turn the screws 26 until the base member is freed therefrom, after which the top member and bolt are removed, the base member reversed, again mounted on the screws 26, and adjusted to the desired position. The screws 32 with their locking members 33 are then replaced.

The support illustrated in the drawings is suitable for use in single duct or two-duct systems. For three-duct systems, the support is generally the same but the base member and clamping member are of increased length.

I claim:

1. In a duct support, the combination of a base member for supporting duct, anchor posts at the ends of the member, and means independent of the posts for adjusting the member lengthwise of the posts.

2. In a duct support, the combination of a base member for supporting duct, anchor posts at the ends of the member, means independent of the posts for adjusting the member lengthwise of the posts, and means for locking the member in adjusted position.

3. In a duct support, the combination of a base member for supporting duct, anchor posts at the ends of the member, means on the ends of the member slidably coacting with the posts, and means independent of the posts for adjusting the member lengthwise of the posts.

4. In a duct support, the combination of a base member for supporting duct, anchor posts interengaging the ends of the member, and means independent of the posts for adjusting the member lengthwise of the posts.

5. In a duct support, the combination of a base member for supporting duct, anchor posts at the ends of the member, slidable connections between the ends of the member and the posts, means independent of the posts for adjusting the member lengthwise of the posts, and means for locking the connections for any position of the member lengthwise of the posts.

6. In a duct support, the combination of a base member for supporting duct, anchor posts at the ends of the member, and a screw cooperating with at least one end of the member independently of the corresponding posts for adjusting the member lengthwise of the corresponding post.

7. In a duct support, the combination of a base member for supporting duct, anchor posts at the ends of the member, a screw cooperating with each end of the member independently of the corresponding post for adjusting the member lengthwise of the posts, and means for locking the member to the posts in adjusted position.

8. In a duct support, the combination of a reversible base member having an offset center portion for supporting duct on its upper side, anchor posts at the ends of the member, and an adjustable connection between the posts and the corresponding ends of the member for locking the latter in adjusted position lengthwise of the posts.

9. In a duct support, the combination of a base member for supporting duct, anchor posts at the ends of the member, said posts each having a vertical slot for the reception of the corresponding end of the member, means for adjusting the member lengthwise of the posts, a clip frictionally engaging each post, and a screw independent of said adjusting means for securing each clip to the corresponding end of the member and for varying the frictional engagement of the clip with the corresponding post.

10. In a duct support, the combination of a base member for supporting duct, anchor posts at the ends of the member, said posts having flanges defining a vertical slot, a clip having a channel embracing the flanges of each post, and a screw passing through each clip and threaded in the corresponding end of the member for locking the same to the posts.

11. In a duct support, the combination of a base member for supporting duct, anchor posts at the ends of the member, means independent of the posts for adjusting said member lengthwise of the post, duct securing means mounted on the member, and means for adjusting the position of the means on the member.

12. In a duct support, the combination of a reversible base member, having an offset center portion for supporting duct in its upper side, anchor posts at the end of the member, a clamp for securing ducts to the offset portion of the member, and a bolt for connecting the clamp to the member.

13. In a duct support, the combination of a reversible base member, having an offset center portion, for supporting duct, anchor posts at the ends of the member, a clamp for securing duct to offset center portion of the member, and a bolt in the clamp passing through a slot in offset center portion of the member, whereby the clamp may be adjusted laterally of the member.

14. In a duct support, the combination of a base member for supporting duct, anchor posts at the ends of the member, a clamp for securing at least two ducts to the member, and means extending from the clamp between the two ducts independently of the member for spacing the ducts on the member.

15. In a duct support, the combination of a reversible base member having a vertically offset center portion for supporting duct on its upper side, anchor posts at each end of the member, releasable connections between the member and the posts, and means, independent of the posts, for adjusting the member lengthwise of the posts.

16. In a duct support, the combination of a reversible base member having a vertically offset center portion for supporting duct on the upper side thereof, means for supporting the member, a clamp for mounting at least two ducts upon the member, means for adjusting the clamp lengthwise of the member to move the ducts transversely, and means on the clamp for spacing the two ducts apart.

17. In a duct support, the combination of a pair of spaced posts, means for anchoring said posts, a reversible member having a vertically offset center portion for supporting at least two ducts on its upper side, lateral flanges on said member, a clamp on said member for securing at least two ducts to the offset center portion of the member, means on the member for spacing the ducts apart, sliding connections between each end of the member and a corresponding post, releasable means cooperating with each end of the member and the corresponding post for locking the member to the post, and a screw journalled on each post and threaded through the corresponding end of the support for adjusting the support lengthwise of the post.

GLENN E. BLINN.